June 4, 1963
H. J. WITKOWSKI
3,091,812
HOT RUNNER MOLD
Filed Sept. 5, 1958
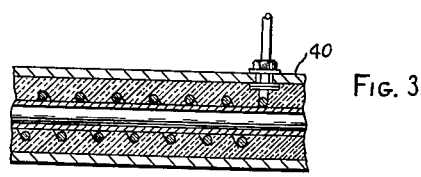
Fig. 3
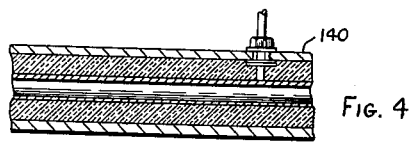
Fig. 4
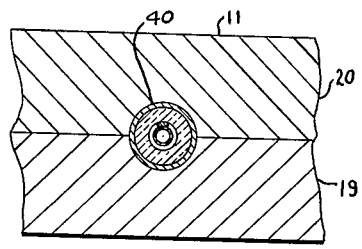
Fig. 2
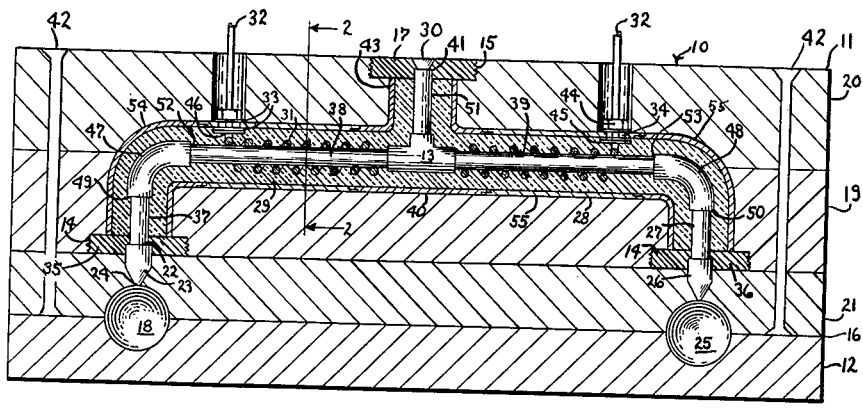
Fig. 1
Fig. 5
INVENTOR.
HENRY J. WITKOWSKI
BY
*Charles L. Lovercheck*
ATTORNEY

United States Patent Office 3,091,812
Patented June 4, 1963

3,091,812
HOT RUNNER MOLD
Henry J. Witkowski, 621 E. 21st St., Erie, Pa.
Filed Sept. 5, 1958, Ser. No. 759,320
6 Claims. (Cl. 18—42)

This invention relates to molding dies and, more particularly, to dies for injection molding processes.

In molding by injection processes, the article being molded is formed in a cavity mold. Where a multi-cavity mold is used, runners are provided to carry plastic from one cavity to another having one part of the runner in each of the mold halves so that when the articles are molded, each article formed in the cavity of the mold is connected by a runner. Plastic at each "shot" solidifies in these runners and constitutes waste material and must be removed from the articles, either directly after the molding process or before the articles are used. In many cases, the material hardening in these runners constitutes a larger amount of material than is found in the molded articles themselves. Therefore, a considerable waste of material results, even though this waste material may be salvaged subsequently by grinding or other reclaiming process.

It is, accordingly, an object of this invention to overcome the above and other disadvantages in molding dies and, more particularly, it is an object to provide a die for molding articles which is simple in construction, economical to manufacture, and simple and efficient in operation.

Another object of this invention is to provide a die for molding articles wherein runners connecting the cavities of the die are surrounding by heating members.

Still another object of the invention is to provide an improved structure of heated runner for a plastic molding die.

A further object of the invention is to provide a runner for a die wherein the runner is made up of a tube for conveying plastic, the tube being surrounded by a heater and the heater being surrounded by insulating material and enclosed in a lead sheet.

A still further object of the invention is to provide a molding die wherein a tubular member surrounding the plastic material supplies heat to the plastic material.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a view of a die according to the invention shown in cross section;

FIG. 2 is a cross sectional view taken on line 2—2 of FIG. 1;

FIG. 3 is a longitudinal cross sectional view of the heated runner according to the invention;

FIG. 4 is a partial longitudinal cross sectional view of the heated runner shown in FIG. 5; and FIG. 5 is a cross sectional view of another embodiment of the invention.

Now with more specific reference to the drawing, the plastic assembly referred to generally at 40 can be made from standard elbows and standard sheath material and, also, standard tubing welded together as indicated and of the proper length to suit the particular installation.

A sheath 28 is made up of a combination of elbows 54 and a T 43 which are connected together by straight runs of tube 55. The tubes 55 are supported in cavities semi-circular in cross section in both an inner part 19 and an outer part 20 of the die. Holes are bored through the inner part 19 to receive the elbows 54.

A mold 10 has an upper mold part 11 and a lower mold part 12. The upper part 11 and the lower part 12 are both made of heavy tool steel. The upper part 11 has threaded holes 14 formed therein. Inserts 35 and 36 are disposed in the threaded holes 14. The two mold parts 11 and 12 fit together along a parting line 16. The two mold parts 11 and 12 will be attached to the ram and platen, respectively, of a molding machine with the injection nozzle on the machine communicating with the interior of the mold 10 through a nozzle plate 17 having a seat 30. The nozzle plate 17 is threadably received in a threaded bore 15. Cavities 18 and 25 are formed in the lower part 12 of the mold 10 and the cavities 18 and 25 will be formed in the shape of the outside of the article to be molded. The number of cavities 18 and 25 will be determined by the design of the job being run.

The mold part 11 can be formed of three parts 19, 20, and 21 connected together by bolts 42 in order to assemble the tubes therein. Each mold part 19 and 20 will have a suitable groove to receive one half of the plastic conductor and sheath 28.

Inside tubes 27, 37, 38, and 39 will be made of stainless steel or some other high tensile strength durable material. The tube 37 will be connected at 22 to an indivdual nozzle 23 which has an outlet 24 to communicate with the interior of the cavity 18. The cavity 25 is connected by a nozzle 26 attached to the tube 27. The nozzles 23 and 26 are attached to the tubes 37 and 27 and the inserts 35 and 36 are attached to the elbows 54 and the tubes 55, respectively, by welding or other fastening means. Since the nozzles 23 and 26 are disposed in countersunk holes in the part 21, they will be clamped by bolts 41 and 42 rigidly in place and the parts 19, 20, and 21 will move as a unit during the molding operation.

The tubes 27, 37, 38, and 39 are disposed in the sheath 28 and insulation material 29 is supported therebetween to prevent the escape of heat from the tubes 27, 37, 38, and 39 to the body of the die itself. A heating band 31 is coiled around the tubes 38 and 39 and has terminals 32 connected thereto and insulated by means of fiber washers 33 and a sleeve 34 from electrical contact with the sheath 28. Nuts 44 are tightened toward a steel washer 45 which is welded to the terminals 32 at 46 to hold the terminals 32 in place.

Elbows 47 and 48 connect the tubes 27, 37, 38, and 39. The elbows 47 and 48 will be in the form of standard elbows and the elbows 47 and 48 have interior diameters the same as the aforementioned tubes and they will be welded to the tubes at 49, 50, 52, and 53. A T 13 is attached to the tubes 38, 39, and 51 and extends upwardly. The tube 51 is attached by welding or other fastening means at 41 to the nozzle plate 17.

It will be noted that when the mold 10 is assembled as shown and the lower part 12 is attached to one plate of the machine and the upper part 11 is attached to the other platen of the machine and the injection nozzle inserted in the seat 30, when the hot plastic is shot into the plastic conducting assembly 40, it will pass into the cavities 18 and 25 and the plastic material which remains in the tube between shots will remain above the melting temperature so that the material therein will remain molten and other waste material will not be present. Further, it will not be necessary to cool the die as much since the die itself will not be heated because of the insulation material 29.

During operation, the various lengths of sheaths and tubing will be assembled to the proper elbows and T's as described and a suitable seat 30 will be formed to receive a nozzle of an injection machine. The nozzles 23 and 26 communicate with the cavities 18 and 25. The terminals 32 will connect the heating band 31 to a proper source of electricity. The other end of the band 31 will be grounded to the die or to the sheath 28 which is, in turn, connected to the die. Then the heat from the heating band 31 will be transferred directly to the inside tubes 27, 37, 38, and 39 and the loss of heat to the mold 10 itself will be reduced by the insulation material 29. Therefore, the insulation of the tube will hold the heat to the plastic material inside the tubes and prevent the plastic from being cooled in between the injection strokes or shots and very little heat will be transferred to the body of the mold 10 itself.

In the embodiment of the invention shown in FIGS. 4 and 5, views similar to those shown in FIGS. 1 and 3 are shown. Parts in FIGS. 4 and 5 corresponding to parts in FIGS. 1 to 3 are referred to by the same index numbers having one hundred added thereto. These views are identical to those shown in FIGS. 1 and 3 with the exception that instead of having the heating band 31 wound around the tubes 38 and 39 as in FIG. 1, terminals 132 are electrically connected directly to tubes 138 and 139. The mold 110 itself will be grounded and, therefore, parallel electrical circuits will be formed between each terminal 132 and insert 135 and between the terminals 132 and insert 117. The tube itself will be made of electrical resistant material such as stainless steel so that the tube itself heats up and will not absorb heat from the plastic material inside it but, rather, the tube may transfer heat to the plastic inside and it will not be necessary to drive heat through the tube into the plastic material.

It will be apparent that various layouts and designs utilizing standard elbows and T's and straight runs of pipe can be utilized to carry out the invention and, therefore, a rugged economical structure will result.

The foregoing specification sets forth the invention in its preferred practical forms but it will be understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A die for plastic molding comprising upper and lower parts joining each other with cavities formed therein, plastic conducting assemblies for carrying plastic through said upper part of said die to said cavities, said plastic conducting assemblies comprising an inner plastic conducting tube disposed in an opening in said upper part, heating means concentrically disposed around said plastic tube, heat insulation material around said heating means, said heat insulation material being also an electrical insulation material, and means to inject plastic material into said tube and through said tube to said cavities.

2. A die having an upper part and a lower part separated by a parting line, cavities formed in said die, means to attach an injection molding machine to said die to inject hot plastic material into said cavities, said means comprising a plastic conducting assembly, said conducting assembly being made of a sheath and a tube for conducting plastic, said tube having an inlet and communicating with said cavities with a heating means therebetween, and heat and electrical insulation means between said plastic tube and said sheath, said heat means comprising an electric wire wound around said plastic conducting tube, said sheath being received in a bore in said die and having a terminal passing to the outside of said die.

3. The die recited in claim 2 wherein said means for injecting plastic comprises said tube made of elbows connected to straight runs or pipe and to T's and T's being connected to said means for attaching to an injection molding machine, the remote end of said inner tube being attached to a device for injecting into a cavity of said die.

4. A plastic molding die comprising an upper half and a lower half, said upper half being divided into an inner and an outer half, a groove formed in said inner half, a groove in said outer half overlying said groove in said inner half, a cavity formed in said lower half, a bore through said inner half connecting said grooves with said cavity, an insert in said bore, said insert being welded to a sheath, said sheath comprising a large tube, a small tube concentrically disposed in said sheath and welded to said insert, a nozzle opening in said insert connecting said small tube with said cavity, an electrical heating element wound around said small tube, heat insulating material disposed between said sheath and said small tube, the end of said small tube remote from said nozzle opening being connected to a second insert, said second insert being welded in an opening in said outer half, and a nozzle opening through said second insert connecting said small tube with the outside of said die.

5. A plastic molding die comprising an upper part and a lower part, said upper part being divided into an inner part and an outer part, a groove formed in said inner part, a groove in said outer part overlying said groove in said inner part, a cavity formed in said lower part, a bore through said inner part connecting said grooves with said cavity, an insert in said bore, said insert being welded to a sheath comprising a large tube, a small tube concentrically disposed in said sheath and welded to said insert, a nozzle opening in said insert connecting said small tube with said cavity, heating means for said tube, heat insulating material disposed between said sheath and said small tube, the end of said tube remote from said nozzle opening being connected to a second insert, said second insert being welded in an opening in said outer part, and a nozzle opening through said second insert connecting said tube with the outside of said die.

6. The die recited in claim 5 wherein said heating means comprises terminals for connecting an electrical current directly to said small tube.

References Cited in the file of this patent

UNITED STATES PATENTS

| | | |
|---|---|---|
| 2,408,629 | Green | Oct. 1, 1946 |
| 2,770,011 | Kelly | Nov. 13, 1956 |
| 2,871,515 | Loew | Feb. 3, 1959 |